Jan. 8, 1929.
W. STARK
1,698,246
GLARE SHIELD FOR VEHICLES
Filed Jan. 15, 1925
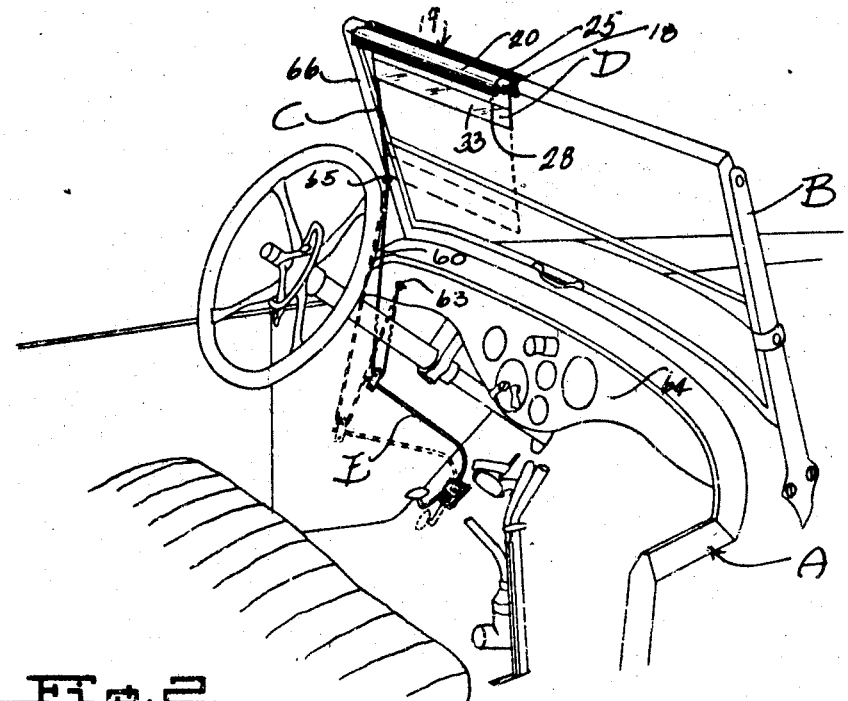
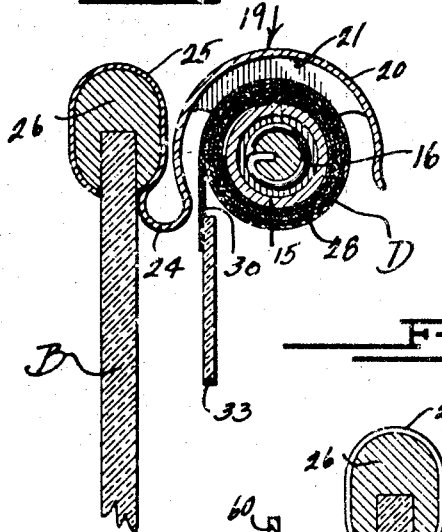
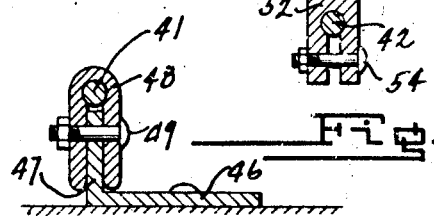

Patented Jan. 8, 1929.

1,698,246

UNITED STATES PATENT OFFICE.

WALTER STARK, OF AUBURN, CALIFORNIA.

GLARE SHIELD FOR VEHICLES.

Application filed January 15, 1925. Serial No. 2,648.

This invention relates to improvements in shield constructions for automotive vehicles.

The primary object of the invention is the provision of a shield adapted for use upon the ordinary windshield of automotive vehicles for the purpose of shielding the vision of the driver of the vehicle from the glare of lights of approaching traffic, including novel means for quickly and conveniently operating the same.

A further object of this invention is the provision of a novel shield for dimming the glare of headlights of approaching traffic, preferably of the curtain type, and including a semi-transparent or diaphanous fabric screen.

A further object of the invention is the provision of improved means for operating a screen of the above mentioned character, and adaptable for various types of vehicles.

Other objects and advantages of this invention will be apparent during the course of the following detailed description.

In the accompanying drawing, forming a part of this specification, and wherein similar reference characters designate corresponding parts throughout the several views, Figure 1 is a perspective view of an automobile, showing the windshield thereof, with the improved glare shield construction associated therewith, and means for operating the same.

Figure 2 is a cross sectional view taken through the improved curtain shield of this invention, showing the preferred means of attaching the same upon the conventional automotive vehicle windshield.

Figure 3 is an end elevation of the improved glare shield.

Figure 4 is a view showing an adjustable operating lever means for controlling action of the glare shield, and Figures 5 and 6 are cross sectional views taken on their respective lines in Figure 4 of the drawing.

In the drawing, wherein for the purpose of illustration is shown only a preferred embodiment of the invention the letter A may generally designate an automotive vehicle, which may include a windshield B. The improved light shield structure C may consist of the curtain means D, and operating means E.

In the preferred instance the curtain means D includes a roller 15, preferably of the spring operating type, having the conventional spiral spring 16 therein for normally holding the same in one position. The roller 15 is adapted to be supported at its ends by end walls 18 of a metal supporting casing 19, which provides the concavo-convex body 20, segmental in cross section and extending preferably for greater than 180° of a circumference, to receive the roller 15 in the compartment 21 thereof and beneath the same. The body 20 at the rear edge thereof is bent, as at 24, and upturned to provide the longitudinally extending jaw 25, which is U-shaped in cross section, and adapted to be snapped over the top channel 26 of the windshield B of the automotive vehicle, and substantially as is illustrated in Figures 1, 2 and 3 of the drawing. Of course, when the roller 15 is supported at its ends in the end walls 18 of the casing 19, this roller is normally resiliently held in one position, and any tendency to rotate the roller 15 from the position will expand or contract the spring 16 out of its inherent position.

The roller 15 is preferably provided with a screened curtain 28, of relatively thin fabric, preferably silk or analogous diaphanous or semi-transparent material, and the curtain is so wound on the roller 15 that the fabric 28 tangentially depends, as at 30, at the side of the roller nearest the windshield B. In the preferred construction of the curtain, a pyroxyline or celluloid screen 33 is preferably attached at the free end of the fabric screen 28, in any approved manner, such as by fusing the pyroxyline into the weave of the fabric. This may readily be accomplished by applying a sufficient quantity of acetone to the joint of celluloid and cloth or fabric and then pressing the cloth into the softened surface of the celluloid or pyroxyline and holding until the pyroxyline hardens with the fabric embedded therein. It is preferred that the pyroxyline screen 33 be of sufficient length that the same may be used as a shield, and the same is flexible so that in case of requirement it may also be rolled upon the roller 17 beneath the casing 19. In the preferred instance, however, the pyroxyline screen portion 33 will be suspended just in sufficiently elevated relation to not interfere with the vision of the driver of the vehicle. It may be desired to make the entire curtain portion of the structure of pyroxyline, although an economical and efficient arrangement is that of providing the fabric portion 28 as shown, which is flexible and thin, requiring but a small roller to support the same, and providing the pyroxyline portion 33 at the free marginal portion of the fabric, and which is of sufficient longitudinal rigidity to permit the efficient lowering and rolling of the curtain structure on the roller 15.

Referring to the operating structure E, it is preferred to manually operate the curtain by the left foot of the driver, so that but little movement of the foot of the driver may move the curtain for a considerable length. To this end an operating lever 40, preferably of J-shaped formation is provided, including the relatively short arm portion 41 and the relatively longer lever arm 42, which are connected in acute angular relation by means of the bight portion 43. In operation, the lever 40 is pivotally supported upon the floor board 45 of the vehicle, by means of a supporting bracket 46, which is provided with a vertical post 47 having a U-shaped clamping member 48 pivoted thereto, as by bolt 49; the bolt 49 according to its adjustment being adapted to clamp the member 48 to the short arm portion 41 of the lever 40, at any desired position along the length thereof. At the end of the short arm portion 41 closest to the driver, an upstanding headed foot engaging enlargement 50 is provided, which the operator may normally engage with the sole of his foot in order to rock the lever 40 upon the pivot axis formed by the bolt 49. The long arm 42 extends upward, preferably at an acute angle to the vertical, and in a direction of the driver, and at its upper end is preferably provided with a substantially U-shaped spring clamp 52, having a pulley wheel 53 rotatably supported therein; the clamp 52 being controlled by means of an adjusting bolt 54, so that the clamp 52 may be adjusted into a fixed relation at any point along the lever arm 42, to increase or decrease the effective leverage action which the lever 40 may have in connection with operation of the curtain.

As part of the operating structure E, a cable 60 is provided, which at one end thereof is connected, as by an eye bolt 63, to the dash or instrument board 64 of the automotive vehicle, and therefrom is trained outwardly and about the pulley wheel 53, and upwardly through a pulley structure 65, which may be connected to the supporting post 66 of the automotive vehicle windshield B. From here the cable 60 extends vertically upward and is preferably connected to the celluloid portion 33 of the curtain at each proper point.

From the foregoing description it is believed that the operation of the curtain will be apparent. Upon pressing upon the head 50 of the operating lever 40, the operator by very little movement may swing the longer arm 42 of the lever 40 through a considerable distance, to effect a considerable pull downwardly upon the curtain of the curtain structure D, until the translucent or diaphanous fabric portion of the screen is placed across the line of vision of the driver of the vehicle, to dim the glaring effect of headlights of approaching traffic. Operation of the lever structure 40 will quickly move the curtain downwardly for the proper length, and the spring 16 of the curtain roller will of course be expanded or contracted, as the case may be, out of its normal inherent relation, and upon release of the lever 40 the roller will automatically move to its normal relation, to roll the curtain thereon. It is preferred that the fabric and the pyroxyline portions 28 and 33 of the curtain be blue in color, as this has been found most effective to dim the glaring effects of headlights of approaching traffic.

Various changes in the shape, size, and arrangement of parts may be made to the form of invention herein shown and described, without departing from the spirit of the same or the scope of the claims.

I claim:

1. In combination with an automotive vehicle including a windshield, a spring operated roller structure supported by the windshield, a curtain extensibly mounted on said spring operated roller, a pivotally mounted lever connected to the vehicle, and means adjustably mounted on the lever and connected with said curtain whereby to vary the effective leverage action of the lever for operation of said curtain.

2. As an article of manufacture a glare shield consisting of a flexible fabric shield portion and a diaphanous portion connected with a marginal portion of the fabric portion by having the diaphanous portion fused in the mesh of the fabric portion.

3. In combination with an automotive vehicle including a windshield, an expansible curtain supported by the windshield upwardly thereon, a substantially J-shaped lever adjustably pivoted to the vehicle including a relatively long lever arm, pulley means adjustably clamped to the relatively long lever arm, and cable means adapted for extension between the adjustable pulley means and the curtain whereby upon operation of the lever the curtain may be lowered across the line of vision of the driver of the vehicle through said windshield.

4. In combination with an automotive vehicle including a windshield, a curtain structure adapted for connection to the automotive vehicle for extension across the line of vision of a driver through the windshield, a cable connected to said curtain, lever operating means of J-shaped formation including a relatively short arm and a relatively longer arm, means pivotally connecting the short arm of the lever to the floor boards of the automotive vehicle, and adjustable means for connecting the cable at any desired point along the longer arm of said lever whereby to increase or decrease the effective lever action of the lever means to increase or decrease the length of pull of the curtain upon operation of the lever means.

5. In combination with an automotive vehicle including a body, a floor, and a windshield, curtain means carried by the vehicle adapted for lowering across the windshield to obstruct the line of vision of the driver of the vehicle, a cable connected at one end to the curtain and at another end to the body of the vehicle, a J-shaped lever including a short arm portion and a longer arm portion connected in acute angular relation with the shorter arm portion, adjustable means for pivotally connecting the shorter arm at any point along its length to the floor boards of the vehicle so that the longer arm will outstand from the floor boards, a clamp member including a pulley wheel adapted to be clamped at any desired point along the length of the longer arm and adapted to receive the cable over said pulley wheel intermediate the ends of the cable so that upon pivotal operation of said lever the cable may be rendered taut to lower the curtain across said windshield of the vehicle.

6. In combination with an automotive vehicle including a windshield, a glare shield curtain, a spring roller for supporting the glare shield curtain adjacent the windshield and normally tending to roll the curtain upon the same, a cable connected with the curtain, an operating lever of substantially J-shaped formation including a pair of arm portions, means connecting the cable for adjustment longitudinally to a desired position upon one of said arm portions, and means operatively mounting the lever for pivoted movement in order that said cable may be drawn taut and moved for the purpose of extending the curtain over said windshield.

7. In combination with an automotive vehicle including a windshield, a glare shield curtain, a spring roller for supporting the glare shield curtain adjacent the windshield and normally tending to roll the curtain upon the same, a cable connected with the curtain, an operating lever of substantially J-shaped formation including a pair of arm portions, means connecting the cable for adjustment longitudinally to a desired position upon one of said arm portions, and means operatively mounting the lever for pivoted movement in order that said cable may be drawn taut and moved for the purpose of extending the curtain over said windshield, said last mentioned means including an adjustable clamp for attachment at any location along the other arm portion to which the cable is not adjustably connected whereby to increase or decrease the leverage action.

8. In combination with a motor vehicle including a windshield, a spring operated roller, means mounting the same upon the windshield, a curtain-like glare shield for the spring roller and adapted to be drawn over the windshield to act as a glare shield for the driver of the motor vehicle, a lever, means connecting the lever with the curtain, and means mounted on the motor vehicle for supporting the lever and including means to vary the pivotal action of the lever with respect to the means which connects the lever with the curtain whereby to vary the effective operating action of the lever upon the curtain.

WALTER STARK.